Figure 6:
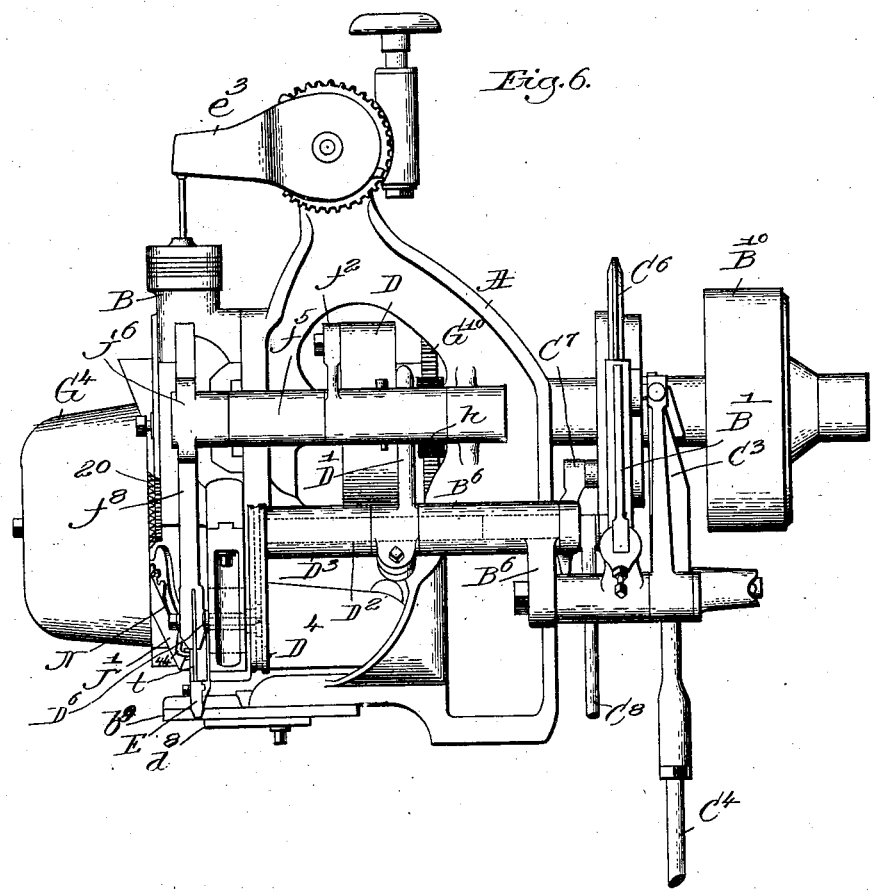

G. GODDU.
MACHINE FOR DRIVING LOOSE NAILS.
APPLICATION FILED SEPT. 22, 1903.
898,573.
Patented Sept. 15, 1908.
6 SHEETS—SHEET 1.
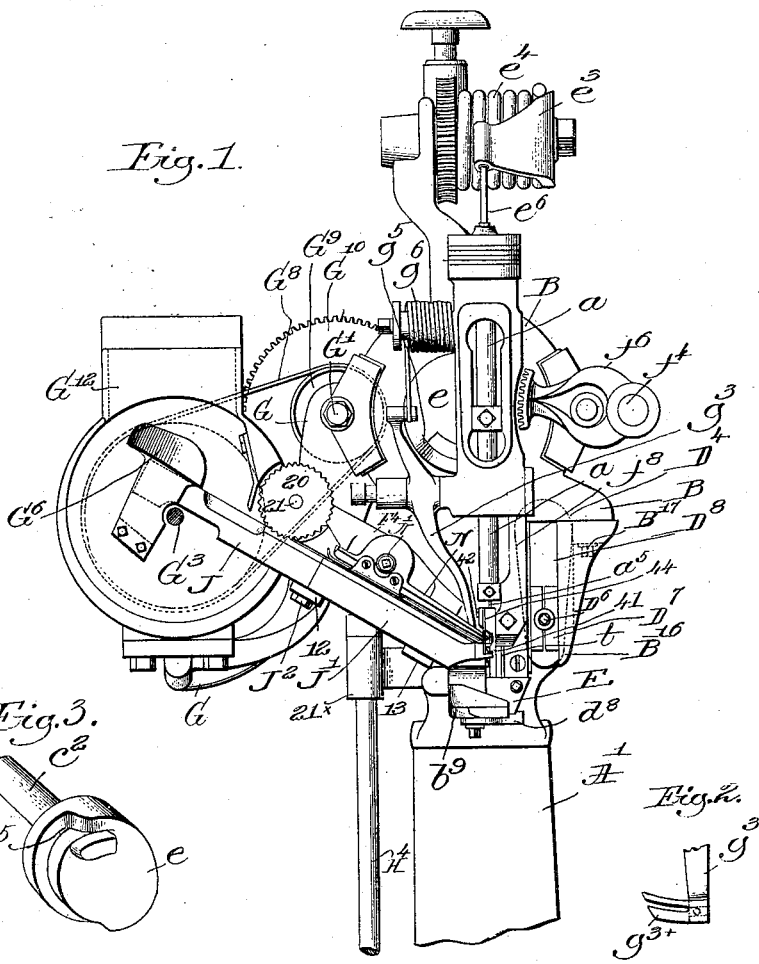

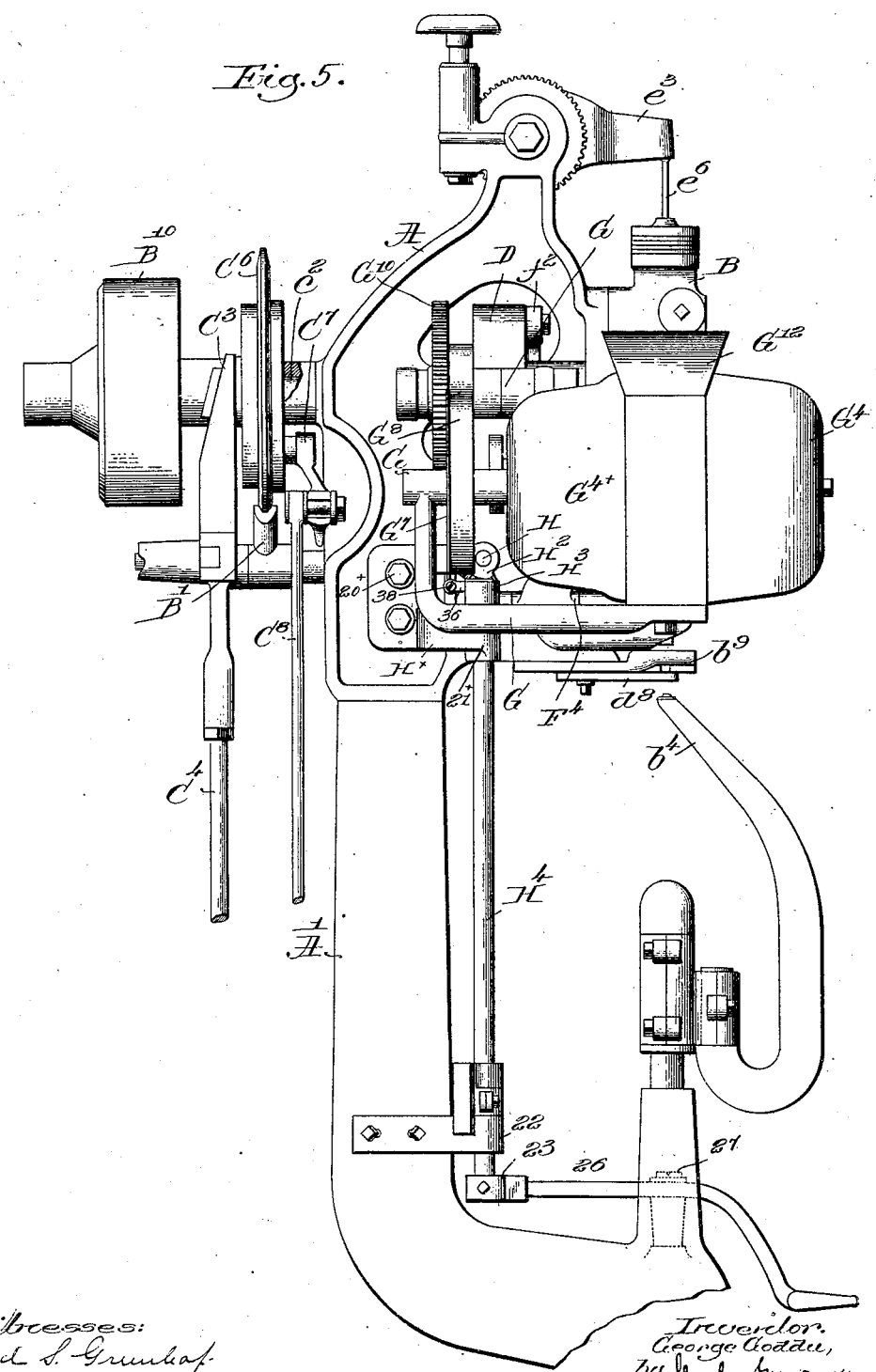

G. GODDU.
MACHINE FOR DRIVING LOOSE NAILS.
APPLICATION FILED SEPT. 22, 1903.

898,573.

Patented Sept. 15, 1908.
6 SHEETS—SHEET 3.

G. GODDU.
MACHINE FOR DRIVING LOOSE NAILS.
APPLICATION FILED SEPT. 22, 1903.

No. 898,573.

Patented Sept. 15, 1908.
6 SHEETS—SHEET 4.

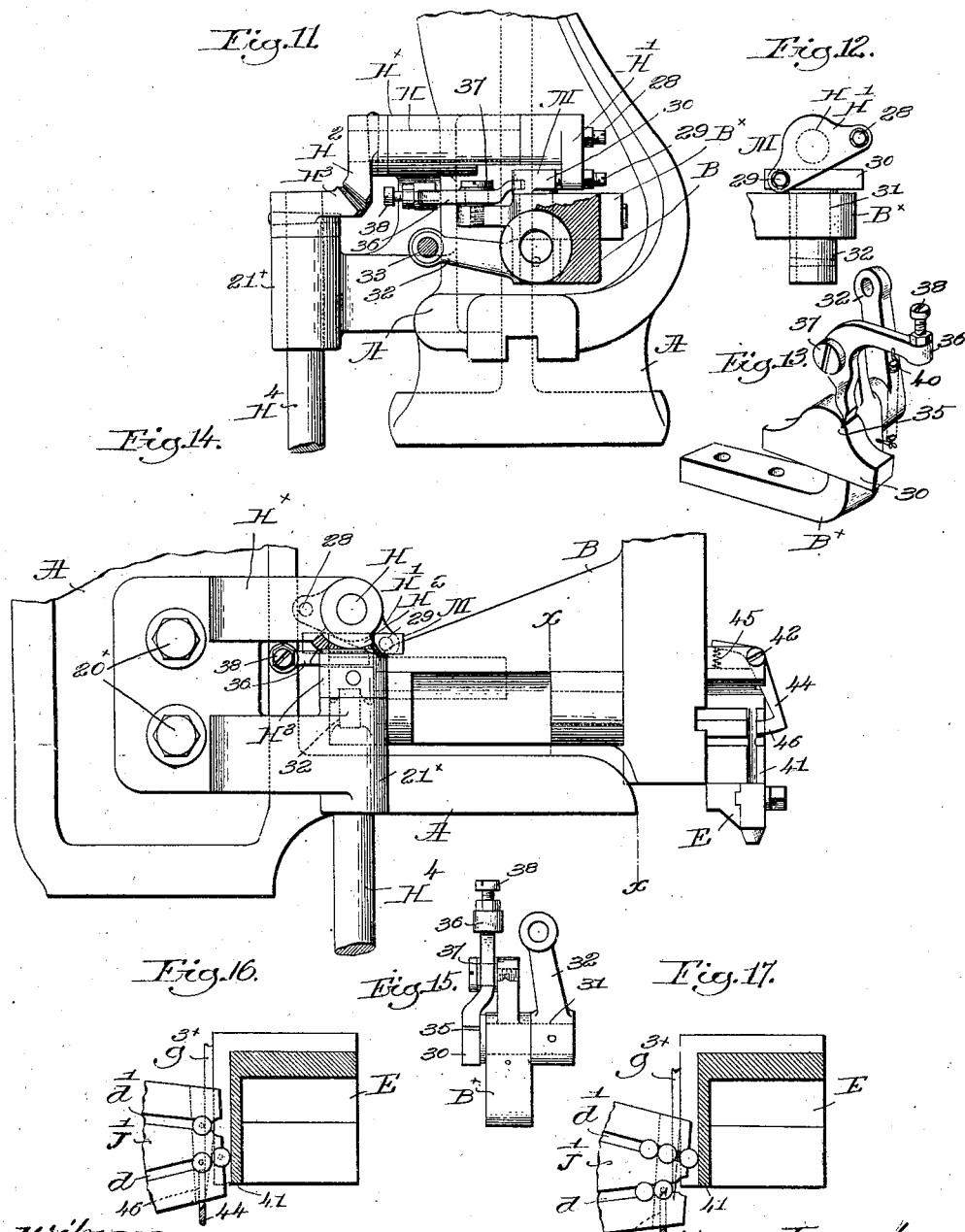

G. GODDU.
MACHINE FOR DRIVING LOOSE NAILS.
APPLICATION FILED SEPT. 22, 1903.

898,573.

Patented Sept. 15, 1908.
6 SHEETS—SHEET 6.

Witnesses:
Fred S. Greenleaf
W. C. Lunsford

Inventor.
George Goddu,
By Crosby Gregory
Attys.

UNITED STATES PATENT OFFICE.

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR DRIVING LOOSE NAILS.

No. 898,573.　　　　Specification of Letters Patent.　　　Patented Sept. 15, 1908.

Application filed September 22, 1903. Serial No. 174,139.

*To all whom it may concern:*

Be it known that I, GEORGE GODDU, a citizen of the United States, residing at Winchester, in the county of Middlesex and State of Massachusetts, have invented an Improvement in Machines for Driving Loose Nails, of which the following description, in connection with the accompanying drawings, is a specification, like letters on the drawings representing like parts.

This invention relates to loose-nailing machines, and has for its object to improve machines of this class by providing them with means for holding a plurality of different kinds of nails and with means for presenting, at the will of the operator, either kind of nails in position to be driven.

The invention is shown as applied to a loose-nailing machine of well-known construction in which the awl, driver, and raceway are mounted in a laterally - swinging head. The head is moved laterally after the awl has penetrated the stock to feed the stock, and then the awl is retracted and the head returned to its original position, to bring the driver into alinement with the hole made by the awl. A nail is then discharged from the raceway into the driver passage in the nose of the machine, from which it is driven into the hole formed for it in the stock by the awl.

In accordance with the present invention the machine is equipped with a multi-part hopper for containing a plurality of kinds of nails, which may differ, for instance, in character or length, and with a raceway having nail-guiding grooves leading from each hopper. The machine is also provided with means, under the control of the operator, by which the raceway may be shifted to bring any one of its nail-guiding grooves into communication with the driver passage in the nose, so that the desired kind of nails may be driven.

The shifting mechanism herein shown comprises a device mounted in the laterally-swinging head and having connection with the raceway, said device being adapted to be operated by contacting, in the return movement of the head, with a manually-controlled device mounted in the stationary part of the machine. By this means the shifting of the raceway is effected automatically during a regular operation of the machine and takes place in one direction or the other according to the position of said manually-controlled device.

To insure the delivery of but a single nail into the driver passage in the nose, I provide a nail-separator having a blade which is adapted to pass between the lowermost nail in the raceway groove and those behind it, thereby permitting the lowermost nail to move into the driver passage and preventing any of the other nails from leaving the raceway groove. The separator herein shown has a single blade which is so constructed that it will be operative without adjustment for separating the nails in whichever groove is in position to have nails delivered from it.

It sometimes happens that the separator blade strikes the side of a nail, instead of passing between two nails, and thereby tends to displace the raceway laterally and put the groove from which the nails are being delivered out of alinement with the driver passage in the nose. To avoid the possibility of this occurring I provide means for locking the raceway, thereby preventing it from being accidentally moved. The locking means herein shown operates automatically to lock the raceway and prevent it from being moved while the separator blade is advancing across a raceway groove for separating the nails, and is thereafter automatically unlocked to enable the raceway to be shifted if it is desired to feed nails from one of the other grooves.

An important feature of the invention, therefore, consists in providing a nailing machine with a raceway having a plurality of nail-guiding grooves adapted to deliver different kinds of nails from a multi-part hopper, combined with means for automatically shifting the raceway during the regular operation of the machine to bring one or the other of the raceway grooves into alinement with the driver passage in the nose, so that different kinds of nails may be driven.

Another feature consists in means under the control of the workman for determining when the shifting of the raceway shall take place, and also for determining the direction in which the raceway shall be shifted.

Still another feature consists in locking the raceway to prevent it from being accidentally shifted. Preferably the raceway-locking mechanism is arranged to be inoperative during a portion of each operation of the machine, to permit the raceway to be shifted if so desired.

The raceway herein shown is provided with two nail-guiding grooves, and when the raceway is in position for delivering nails from the outermost groove into the driver passage, the separator blade, which is then operative for separating the nails in said outermost groove, also extends across the innermost nail-guiding groove and serves as a stop or gate for holding back the nails in the latter groove so that they will not escape or get into position to interfere with the subsequent adjustment of the raceway for delivering nails from said innermost groove. Preferably, and as herein shown, means will also be provided for holding back the nails in the outermost groove when the raceway is in position for delivering nails from the innermost groove. For this purpose the machine is provided with an arrester arranged to hold back the nails in the outermost groove when the raceway is in position for delivering nails from the innermost groove. The arrester is herein shown as arranged to become operative automatically for this purpose when the raceway is moved out of position for delivering nails from the outermost groove and to become inoperative automatically when the raceway is shifted into position for delivering nails from the outermost groove.

These and other features of the invention, including certain details of construction and combination of parts, will be hereinafter more fully described and will be pointed out in the claims.

My present invention is shown as embodied in a loose-nailing machine of the type shown in United States Letters Patent No. 490,624, dated January 24, 1893, to which reference is made for a complete description of parts herein shown but not specifically described.

Figure 7:
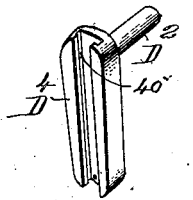
Figure 8:
Figure 9:
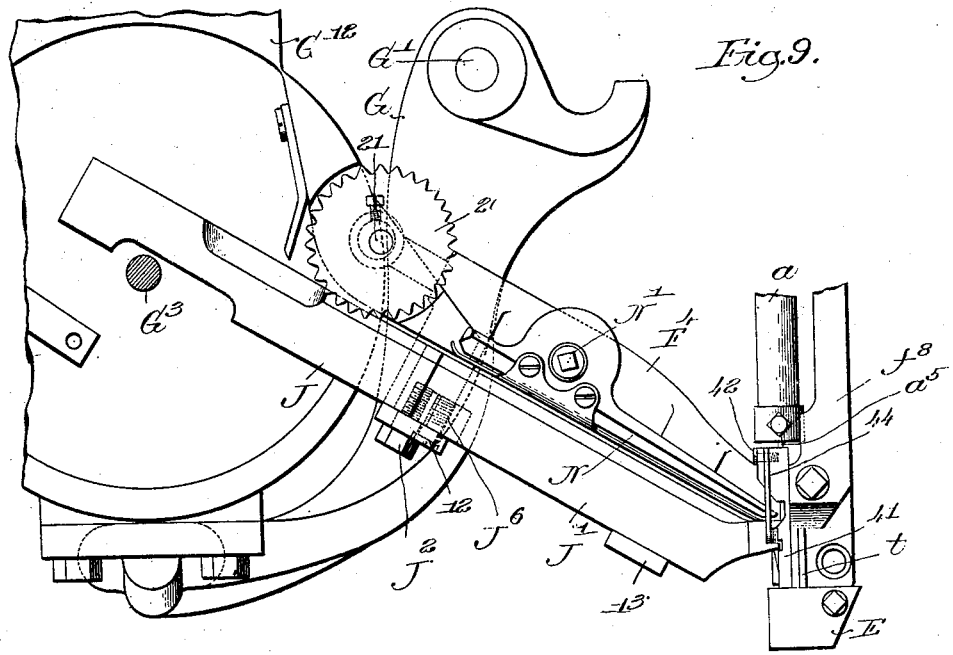
Figure 10:
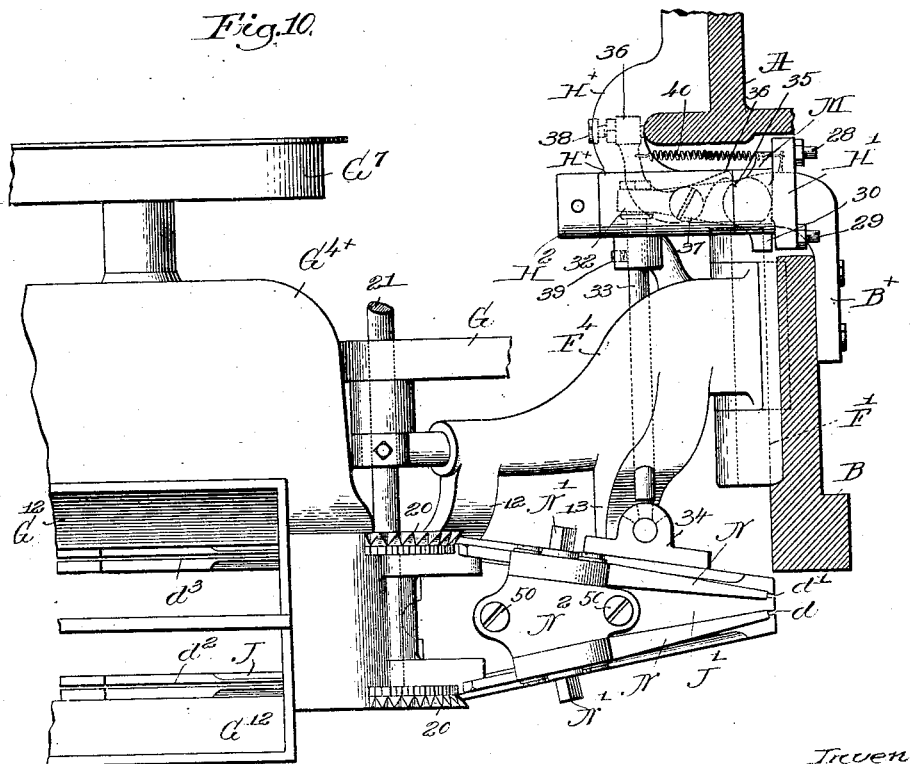
Figure 18:
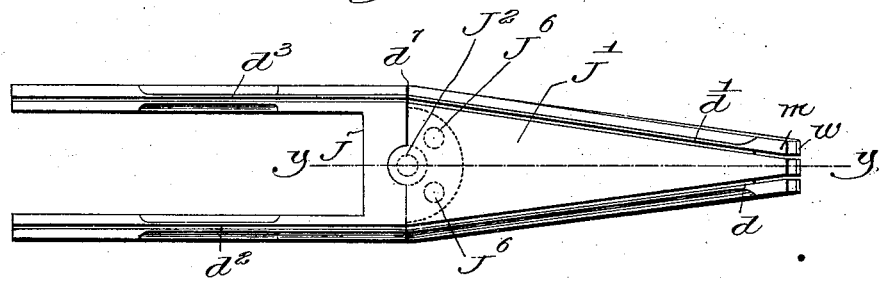
Figure 19:
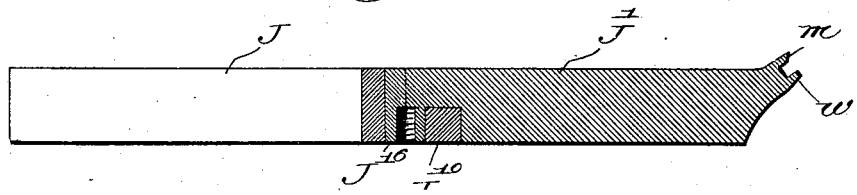
Figure 20:
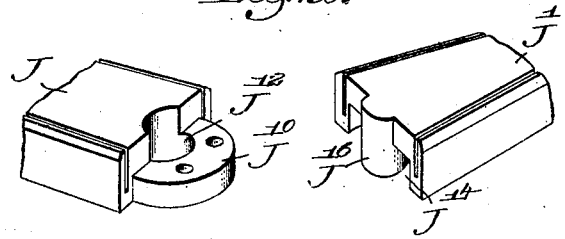

In the drawings, Figure 1 represents a front elevation of a machine of the type above referred to with my improvements added thereto, part of the hopper being removed; Fig. 2 is a detail view of the separator; Fig. 3 is a detail view of the cam disk $e$ which elevates the driver bar and moves the separator; Fig. 4 is a detail showing the knee lever and parts moved by it, the column $A'$ being shown in section; Fig. 5 is a left-hand side elevation of the machine shown in Fig. 1, the complete hopper being shown in this figure; Fig. 6 is a right-hand side elevation of the machine shown in Fig. 1; Fig. 7 is a detail showing the feed arm $D^4$; Fig. 8 is a detail showing the stud $D^5$ mounted in the slot in the feed arm; Fig. 9 is an enlarged detail and side elevation of the raceway, the nose, part of the awl bar and awl, and driver bar and driver, the arrester coöperating with the outer groove of the raceway, a portion of the hopper, and the bracket which sustains the hopper; Fig. 10 is a plan view of the parts shown in Fig. 4, but with the awl bar, driver bar and nose omitted; Fig. 11 is an enlarged detail looking from the right of the dotted line $x$, Fig. 14, chiefly to illustrate the means for moving the delivery end of the raceway; Fig. 12 is an enlarged detail of part of the raceway-moving mechanism as seen from the right of Fig. 11; Fig. 13 is a detail perspective view of the actuator and the bracket in which it is mounted; Fig. 14 is an enlarged detail of some of the parts looking at the left-hand side of the machine, the hopper and raceway being removed; Fig. 15 is an end view of the actuator and bracket shown in Fig. 13; Figs. 16 and 17 are enlarged details of part of the delivery end of the raceway and part of the nose; Fig. 18 shows a plan view of the raceway; Fig. 19 is a section thereof on the line $y$—$y$ of Fig. 18; and Fig. 20 is a perspective view of the raceway showing the connection between the receiving and delivery portions thereof.

The machine shown in the drawings comprises the column $A'$, to the upper end of which the frame $A$ is attached. Mounted in the frame $A$ is the main shaft $c^2$, having fixed thereon a cam-block $D$ provided at its rear side with a cam-groove adapted to receive a roller carried by an arm $D'$, see Fig. 6, fast on a rockshaft $D^2$ extending through a bearing $D^3$ forming part of the head $A$, said rockshaft at its front end carrying a feed arm $D^4$ adapted to move the swinging head $B$, which is pivotally mounted on a circular projection forming part of head $A$.

The front face of the feed arm $D^4$ is grooved at $40^\times$, as shown in Fig. 7, to receive the foot of a hollow stud $D^5$ fitted to slide in said groove, said stud having screwed into and through it a stud screw $D^6$. Loosely embracing the stud $D^5$ back of the head of the stud screw $D^6$ are two blocks $D^7$, the flat faces of said blocks entering and sliding in a slot $D^8$ formed between a part of the swinging head $B$ and an arm $B^{16}$, the latter being adjustably connected therewith by a set screw $B^{17}$ to enable the arm to be adjusted on the head $B$ to compensate for wear of the blocks $D^7$ and stud $D^5$. As the rockshaft $D^2$ is vibrated by means of the arm $D'$ and cam block $D$, the head $B$ will be oscillated, thereby feeding the stock, as hereinbefore described.

The swinging head $B$ is provided with a nose $E$ having a driver passage, said nose being shaped next the delivery end of the raceway to aid in sustaining the same. Mounted in the head $B$ is an awl bar $f^8$ carrying an awl $t$ and adapted to be moved downwardly, to penetrate the stock, by a toothed sector $f^6$ connected with a rockshaft $f^4$ mounted in a stationary bearing $f^5$. The driver bar $a$ carrying the driver $a^5$ is also mounted in the head B, and is elevated by means of a cam projection on disk $e$ connected with the main shaft $c^2$, see Fig. 3, and is depressed by the spring $e^4$ acting through lever $e^3$ and link $e^6$.

The separator lever $g^3$ is pivoted on a projection of the head B, and carries at its lower end the separator blade $g^{3\times}$, shown in detail in Fig. 2, said lever being moved in one direction by the cam $g^5$ formed on the face of the disk $e$ and in the opposite direction by the spring $g^6$.

The bracket G is mounted on the stud G' and extends downwardly and outwardly to support the stationary part $G^{12}$ of the hopper and the shaft $G^3$, which has secured to it at either side of the stationary part of the hopper two movable drums $G^4$ and $G^{4\times}$ adapted to contain different kinds of nails and being provided at their inner sides with usual buckets common to said Patent No. 490,624 for depositing the nails on shelves $G^6$, $G^6$ mounted on the stationary part of the hopper. The shaft $G^3$ carries the belt pulley $G^7$, which is driven by means of a belt $G^8$ surrounding said pulley and the pulley $G^9$ attached to the gear $G^{10}$ loose on stud G', said gear being driven by means of a gear $h$ carried by the main shaft $c^2$, thereby operating to rotate the shaft $G^3$ and the movable drums of the hopper.

Connected to the swinging head B by a pin F' is a bracket $F^4$ which is provided with arms 12, 13 to sustain the raceway hereinafter described, said raceway being kept free of imperfectly lodged nails by means of toothed clearers 20, 20 located above the raceway and fast on shaft 21 mounted in bracket G. The machine is also provided with the brake wheel $C^6$, brake B', and fast and loose clutch pulleys mounted on shaft $c^2$, one adapted to be rotated continuously and the other to be forced into driving contact therewith by a wedge $C^3$ connected with a rod $C^4$ which may be actuated by a treadle in usual manner. The lever $C^7$ pivoted on the framework, and having an attached rod $C^8$ for operating any usual horn depressing mechanism, the horn $b^4$, the edge gage $d^8$ and foot-plate $b^9$ are similar to those in the machine of the patent before referred to.

The raceway to be herein described, and illustrated separately in Figs. 18, 19 and 20, is separated transversely to form a nail-receiving portion J and a nail-delivery portion J'. The portion J is provided with a lip $J^{10}$ and a circular opening $J^{12}$ adapted to receive the stud part $J^{16}$ projecting from the portion J', said portion J' being cut away at $J^{14}$ to receive the lip $J^{10}$, and also having one half of its abutting end slightly beveled off at $d^7$, as shown in Fig. 18, to enable said delivery portion to be moved relatively to the nose, so that either groove in the raceway may be brought into alinement with the driver passage in the nose.

The nail-receiving portion J of the raceway see Fig. 18 is herein represented as bifurcated to embrace see Figs. 1, 9, and 10 the stationary part $G^{12}$ of the hopper sustained on the bracket G, said receiving portion being provided with nail-guiding grooves $d^2$ and $d^3$, into which the nails drop from the shelves $G^6$, $G^6$ upon which they have been deposited by the usual lifters or buckets carried by the movable drums $G^4$ and $G^{4\times}$ of the hopper.

The nail-delivery portion of the raceway is provided with nail-guiding grooves $d$ and $d'$, into which the nails travel from the grooves $d^2$ and $d^3$ of the receiving portion of the raceway. As shown in Fig. 9, the delivery portion of the raceway is sustained on arms 12 and 13 extending from the bracket $F^4$, the receiving portion of the raceway being sustained on the arm 12, to which it is rigidly attached by screws $J^6$, as shown in dotted lines in Figs. 9 and 18. A screw $J^2$ passes through the arm 12 and enters a threaded opening in the stud part $J^{16}$ of the delivery portion of the raceway, thereby retaining the stud part $J^{16}$ in the opening $J^{12}$ and preventing the receiving and delivery portions of the raceway from being accidentally detached. The extreme lower end of the portion J' is provided with tongues $m$ and $w$ which engage grooves in the side of the plate 41 forming part of the nose E, thereby forming a support for the lower end of the raceway.

For the purpose of moving the raceway I have mounted in a bracket $B^\times$, secured to the movable head B by screws, see Figs. 10, 11, 12, 13 and 15, a raceway-actuator M, which comprises the vertical rockshaft 31 having at its upper end the head 30 and at its lower end the laterally-projecting arm 32. The free end of the arm 32 is connected with one end of a link 33 pivoted to a block 34 secured to the inner side of the raceway, see Fig. 10, said link being engaged by a friction device 39. This actuator is rocked so as to move the link 33, and thus shift the raceway, by means of a manually-controlled device mounted in the stationary head A of the machine, and which consists of the head H' mounted at one end of a rockshaft H supported in the bearing $H^\times$ secured to the head A by screws $20^\times$. At the opposite end of the shaft H from that on which the head H' is mounted is a toothed sector $H^2$ adapted to coöperate with a toothed sector $H^3$ at the upper end of a shaft $H^4$ held in bearings $21^\times$, 22, and provided at its lower end with a forked arm 23 that is engaged by the ball-shaped end 24 of a manually-controlled lever 26, herein shown as a knee lever, pivoted at 27 on an ear projecting from the column A'.

When the operator desires to shift the raceway so as to present a nail of different character or length to the driver passage in the nose, he moves the lever 26 in the desired direction, thereby rocking the shaft H so as to depress one end of the head H', which is provided with contact screws 28 and 29, see Fig. 12. When the swinging head B is moved backwardly to starting position after feeding the stock, the actuator M will engage the contact screw in that end of the head H' which is then depressed, and thereby rock the shaft 31, which, through means of the arm 32 at its lower end, moves the link 33 connected to the raceway. By providing the head H' with adjustable contact points the distance which the raceway is moved can be varied by adjusting the screws 28 and 29.

From the foregoing description it will be seen that nails of the same character or length can be driven at successive descents of the driver, or nails of different character or length can be driven at successive descents of the driver. If at one descent of the driver the outer nail-guiding groove of the raceway is in alinement with the driver passage of the nose, it having presented a nail of the character and size contained in that raceway groove, and it is desired to drive a nail of the character or size contained in the inner groove of the raceway at the next descent of the driver, the operator simply shifts the lever 26 so as to depress the other end of the head H', and at the return movement of the swinging head B the actuator will be moved to shift the raceway so as to bring the inner groove of the raceway into alinement with the driver passage in the nose.

To prevent the actuator or the raceway from being moved accidentally while the outermost groove is in position for presenting nails to the driver passage, I have provided the head 30 of the actuator with a notch 35 that is engaged normally by one end of a locking device 36, shown, in Figs. 11, 13 and 15 and in dotted lines in Fig. 10, as a lever pivoted on a stud 37 and having at one end an adjustable stop 38 that is held normally toward the frame A by a spring 40. The stud 37 enters an ear, see Figs. 11, 13 and 15, extended from the bracket B$^\times$, and just before the head B, in its backward movement after feeding the stock, brings the head 30 of the actuator in position to meet the contact screw of the controller, the stop 38 strikes the stationary head A, see Fig. 10, and the locking device is turned against the stress of the spring 40, thus releasing the actuator and permitting it to be turned by contact with that screw in the controller which is then in operative position, thereby moving the raceway so that the innermost groove will be put in operative position.

When the raceway is in position for feeding nails from the innermost groove, the abutting ends of the receiving and delivery portions prevent any outward movement of the delivery portion of the raceway, and the friction device 39 bearing on the link holds said delivery portion in this position and tends to prevent any inward movement thereof. Consequently if the separator blade, instead of passing between two nails, should strike the side of one of the nails in the raceway no damage would be done, for the reason that the spring $g^6$ would yield and the position of the delivery end would not be changed; but if the delivery end had been in position for feeding nails from the outermost groove, and the separator blade had accidentally engaged the side of a nail, the delivery end would be moved. Therefore it is necessary to positively lock the raceway when it is in position for delivering nails from the outermost groove.

The plate 41, see Figs. 1 and 14, comprising part of the usual nose E and extending upwardly therefrom, has pivoted upon it at 42 an arrester 44 made as a lever. A spring 45, acting against the short arm of the lever, causes the beveled finger 46 at the opposite end thereof to be held or forced yieldingly toward the raceway. When the raceway is in position for the groove $d'$ to deliver nails to the driver passage in the nose, see Fig. 17, the finger of the arrester enters a space near the end of the raceway at its outer side and contacts with the side of the endmost nail in the outer groove $d$, thereby clamping it and preventing it and other nails back of it from leaving said groove, the separator $g^{3\times}$ at such times acting to let the nails out of the groove $d'$ one at a time. When the raceway occupies the position shown in Fig. 16, with the groove $d$ in alinement with the driver passage in the nose E, the arrester 44 will be permitted, by the raceway moving away therefrom, to come into an inoperative position, and the separator $g^{3\times}$ will let the nails out of this groove one at a time, said separator also acting as an arrester or stop for the lowermost nail in the groove $d'$ at all times, whether the inner or the outer groove is in position.

The separator is constructed and operates substantially the same as the separator in the machine of the patent before referred to. The separator blade $g^{3\times}$ is mounted on the lower end of lever $g^3$ and is bifurcated so as to straddle the part $w$ of the raceway, thereby preventing the nails from leaving the grooves in the raceway unless the separator is moved for this purpose. The cam part $g^5$ of the disk $e$ operating on the upper end of the lever $g^3$ moves the separator rearwardly as soon as the driver bar has been elevated, to allow the lowermost nail in the raceway groove to enter the driver passage in the nose, and the spring $g^6$ moves it forwardly to again close the lower end of the raceway groove.

I employ covers N of usual shape, the under sides of which occupy a position just above the heads of the nails hanging in the raceway grooves, and each of these covers is connected by a bolt N' to a block N² fastened to the upper side of the delivery end J' of the raceway by suitable screws 50, shown in Fig. 10.

Obviously, the improvements herein described for shifting the nail-guides leading from the sources of fastening supply from one position to another are equally applicable to nailing machines of other general types than that specifically herein described. For example, in place of the laterally-swinging head for actuating the automatic shifting mechanism there may be provided a head which is reciprocated laterally in guides or otherwise, and, in fact, any convenient moving part of the machine may be readily utilized, without departing from the scope or spirit of the invention, to actuate the shifting mechanism by contact therewith after said mechanism has been placed in the desired position by the manually-controlled setting device.

Having described my invention, what I claim as new and desire to secure by Letters Patent of the United States, is:—

1. In a machine of the class described, a movable head, a raceway having a plurality of nail-guiding grooves, and means actuated by a movement of the head for shifting the raceway.

2. In a machine of the class described, a movable head, a driver, a nose carried by the head and having a driver passage, a raceway, and means actuated by a movement of the head for changing the relative positions of the raceway and nose.

3. In a machine of the class described, a movable head provided with a nose having a driver passage, a driver mounted in the head, a movable raceway for delivering nails to the driver passage in the nose, means actuated by a movement of the head for shifting the raceway, and means for locking the raceway to prevent accidental movement thereof.

4. In a machine of the class described, a movable head provided with a nose having a driver passage, a driver mounted in the head, a movable raceway for delivering nails to the driver passage in the nose, means actuated by a movement of the head for shifting the raceway, and means for locking the raceway to prevent accidental movement thereof, said locking means being inoperative during a portion of the movement of the head.

5. In a machine of the class described, a nose having a driver passage, a driver, a multi-part hopper for containing different kinds of nails, a raceway comprising a nail-receiving portion and a separate nail-delivering portion, each provided with a plurality of grooves for conducting nails from the hopper to the driver passage, and means for moving the nail-delivering portion of said raceway with relation to the nail-receiving portion thereof, to bring any desired groove into position to deliver nails to the driver passage.

6. In a machine of the class described, a nose having a driver passage, a driver, a hopper adapted to contain different kinds of nails, a raceway comprising a nail-receiving portion and a nail-delivering portion in alinement with each other, each portion provided with a plurality of nail-guiding grooves, and means for moving the nail-delivering portion of said raceway with relation to the nail-receiving portion thereof, to bring any desired groove into alinement with the driver passage.

7. In a machine of the class described, a movable head, a driver, a nose having a driver passage, a movable raceway, means actuated by a movement of the head for shifting the raceway, and means under the control of the operator for determining when the raceway is to be shifted.

8. In a machine of the class described, a movable head, a driver, a nose having a driver passage, a movable raceway, means actuated by a movement of the head for shifting the raceway, and means under the control of the operator for determining when and in which direction the raceway is to be shifted.

9. In a machine of the class described, a movable head, a movable raceway, a raceway actuator carried by said head and arranged to shift the raceway, and means for operating the actuator.

10. In a machine of the class described, a movable head, a multi-part hopper for containing different kinds of nails, a movable raceway provided with a plurality of nail-guiding grooves for presenting nails to the driver, and means for automatically shifting the raceway to put one or another of the grooves in position to present nails to the driver.

11. In a machine of the class described, a movable head, a driver, a raceway comprising nail-receiving and nail-delivery portions having a plurality of grooves for presenting different kinds of nails to the driver, a raceway-shifting mechanism carried by the movable head and connected with said raceway, and a manually-controlled device carried by a stationery part of the machine and adapted to actuate the raceway-shifting mechanism when the head moves in one direction.

12. In a machine of the class described, a driver, a raceway provided with a plurality of nail-guiding grooves, automatic means to move the raceway to bring any one groove into alinement with the driver, and an arrestor constructed and arranged to be moved into position to arrest the nails in one groove while another groove is in alinement with the driver.

13. In a machine of the class described a driver, a raceway provided with a plurality of nail guiding grooves, automatic means to move the raceway to bring any one groove into alinement with the driver and means for locking the raceway to prevent accidental movement thereof.

14. In a machine of the class described a driver, a raceway provided with a plurality of nail guiding grooves, automatic means to move the raceway to bring any one groove into alinement with the driver and automatic means for locking the raceway to prevent accidental movement thereof.

15. In a machine of the class described a driver, a raceway provided with a plurality of nail guiding grooves, automatic means to move the raceway to bring any one groove into alinement with the driver, nail separating means, and locking means to prevent movement of the raceway during the nail separating operation.

16. In a machine of the class described, the combination with a driver, a raceway provided with a plurality of nail guiding grooves and means to move the raceway to bring any one groove into alinement with the driver, of controlling means for said moving means, means for effecting a relative movement of said moving means and said controlling means into and out of operative engagement, and means for effecting variations in the points of engagement of said moving means and said controlling means.

17. In a machine of the class described, the combination with a driver, a raceway provided with a plurality of nail guiding grooves, and means to move the raceway to bring any one groove into alinement with the driver, of controlling means for said moving means, means for effecting a relative movement of said moving means and said controlling means into and out of operative engagement, and means which may be operated while said moving means and said controlling means are out of operative engagement to effect nail selecting variations in the points at which said means come into operative engagement.

18. In a machine of the class described, a driver, a raceway provided with a plurality of nail-guiding grooves, automatic means to move the raceway to bring any groove into alinement with the driver, a separator controlling at all times the nails in one groove, and an arrestor constructed and arranged to be moved into operative position to arrest the nails in another groove when the first-named groove is in alinement with the driver.

19. In a machine of the class described, a nose provided with a driver passage, a raceway having two nail-guiding grooves, automatic means to move the raceway to bring either groove into alinement with the driver passage to deliver nails thereto, a separator to pick the nails from either groove, said separator also acting as an arrestor to arrest the nails in one groove when the other groove is in alinement with the driver passage, and automatically-operative means to arrest the nails in the latter groove when the former groove is in alinement with the driver passage.

20. In a machine of the class described, a nose having a driver passage, a raceway provided with two nail-guiding grooves, automatic means to move the raceway to bring either groove into alinement with the driver passage to deliver nails thereto, a separator controlling the nails in one groove and arranged to pick the nails from the other groove, and means rendered operative by the movement of the raceway to arrest the nails in the latter groove when the former groove is in alinement with the driver passage.

21. In a machine of the class described, a hopper having a plurality of rotable members, a central stationary portion located between said members, combined with a raceway comprising a bifurcated nail receiving portion and a nail delivering portion jointed thereto, each of said portions having a plurality of grooves, the bifurcated portion embracing the stationary portion of the hopper between the rotating members thereof, a nose having a driver passage, a driver, and means for moving the nail delivering portion to conduct nails from either groove to the driver passage.

22. In a machine of the class described, fastening-inserting mechanism including a driver, a plurality of sources of fastening supply, each containing a different kind of nail, means for presenting nails to the driver comprising a raceway having a nail-guide leading from each source of supply to the inserting mechanism, and means under control of the operator which, after actuation by him, causes the raceway to be automatically shifted by the machine to put one or another of the guides into position to present nails to the driver.

23. In a machine of the class described, a driver, a multi-part hopper for containing different kinds of nails, a movable raceway provided with a plurality of nail-guiding grooves for presenting nails to the driver, and means under control of the operator which, after actuation by him, causes the raceway to be automatically shifted by the machine to put one or another of the grooves into position to present nails to the driver.

In testimony whereof, I have signed my name to this specification, in the presence of two subscribing witnesses.

GEORGE GODDU.

Witnesses:
Geo. W. Gregory,
Edith M. Stoddard.